(12) United States Patent
Chuppala et al.

(10) Patent No.: US 10,956,226 B2
(45) Date of Patent: Mar. 23, 2021

(54) BASIC RUNTIME ENVIRONMENT

(71) Applicant: Futurewei Technologies, Inc., Plano, TX (US)

(72) Inventors: Ravi Shanker Chuppala, Cupertino, CA (US); Jun Xu, Cupertino, CA (US); Sheng Xu, Pleasanton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 167 days.

(21) Appl. No.: 16/039,924

(22) Filed: Jul. 19, 2018

(65) Prior Publication Data

US 2020/0026578 A1 Jan. 23, 2020

(51) Int. Cl.
| | |
|---|---|
| *G06F 9/46* | (2006.01) |
| *G06F 9/50* | (2006.01) |
| *G06F 9/445* | (2018.01) |
| *G06F 9/54* | (2006.01) |
| *G06F 9/455* | (2018.01) |

(52) U.S. Cl.
CPC ........ *G06F 9/5077* (2013.01); *G06F 9/44505* (2013.01); *G06F 9/45529* (2013.01); *G06F 9/505* (2013.01); *G06F 9/5072* (2013.01); *G06F 9/545* (2013.01)

(58) Field of Classification Search
None
See application file for complete search history.

(56) References Cited

U.S. PATENT DOCUMENTS

| | | | |
|---|---|---|---|
| 6,587,938 B1 | 7/2003 | Eilert et al. | |
| 9,367,305 B1 * | 6/2016 | Kumar | G06F 8/30 |
| 10,152,357 B1 * | 12/2018 | Espy | G06F 9/505 |
| 10,282,804 B2 * | 5/2019 | Schluessler | G06F 9/4881 |
| 2004/0025068 A1 * | 2/2004 | Gary | G06F 1/26 |
| | | | 713/300 |

(Continued)

FOREIGN PATENT DOCUMENTS

| | | |
|---|---|---|
| CN | 101833465 A | 9/2010 |
| CN | 102479108 A | 5/2012 |
| CN | 102934081 A | 2/2013 |
| CN | 107832129 A | 3/2018 |

OTHER PUBLICATIONS

Asiatici et al., "Virtualized Execution Runtime for FPGA Accelerators in the Cloud", Feb. 2, 2017, IEEE, vol. 5, 1900-1910.*

(Continued)

*Primary Examiner* — Kenneth Tang
(74) *Attorney, Agent, or Firm* — Conley Rose, P.C.

(57) ABSTRACT

A computer implemented method for providing workload resource management to applications in an embedded system. The method includes receiving, by an application-specific basic runtime environment (BRE), workload resource requirements of an application installed on the embedded system. The method includes obtaining, by the application-specific BRE, the workload resource requirements from an operating system of the embedded system. The method includes providing, by the application-specific BRE, the workload resource requirements to the application. The method includes initiating, by the application-specific BRE, the execution of the application on the embedded system.

20 Claims, 4 Drawing Sheets

(56) References Cited

U.S. PATENT DOCUMENTS

| | | | | |
|---|---|---|---|---|
| 2006/0259577 | A1* | 11/2006 | Fritsch | H04L 41/5054 709/217 |
| 2011/0041138 | A1* | 2/2011 | Qing | H04L 67/2819 719/314 |
| 2011/0231440 | A1* | 9/2011 | Vlaovic | G06F 8/71 707/769 |
| 2011/0289507 | A1 | 11/2011 | Khan et al. | |
| 2012/0011513 | A1* | 1/2012 | McConaughy | G06F 9/545 718/100 |
| 2013/0297673 | A1* | 11/2013 | McGrath | G06F 9/505 709/203 |
| 2015/0212812 | A1* | 7/2015 | Tripathi | G06F 9/44505 717/120 |
| 2015/0281336 | A1* | 10/2015 | Beale | G06F 11/1469 709/201 |
| 2016/0335138 | A1* | 11/2016 | Surti | G06F 9/44526 |
| 2016/0357541 | A1* | 12/2016 | Offer | G06F 8/61 |
| 2016/0371127 | A1* | 12/2016 | Antony | G06F 9/45558 |
| 2017/0329642 | A1* | 11/2017 | Kim | G06F 9/5011 |
| 2018/0046457 | A1* | 2/2018 | Branca | G06F 11/008 |
| 2018/0293700 | A1* | 10/2018 | Tian | G06F 9/455 |
| 2018/0357150 | A1* | 12/2018 | Chaubey | G06F 11/3664 |
| 2019/0173841 | A1* | 6/2019 | Wang | H04L 63/164 |
| 2020/0034062 | A1* | 1/2020 | Gill | G06F 3/067 |

OTHER PUBLICATIONS

Kjeldsberg et al., "READEX: Linking Two Ends of the Computing Continuum to Improve Energy-efficiency in Dynamic Applications", 2017, IEEE, pp. 109-114. (Year: 2017).*

Machine Translation and Abstract of Chinese Publication No. CN101833465, Sep. 15, 2010, 19 pages.

Machine Translation and Abstract of Chinese Publication No. CN102479108, May 30, 2012, 27 pages.

Machine Translation and Abstract of Chinese Publication No. CN107832129, Mar. 23, 2018, 12 pages.

Foreign Communication From a Counterpart Application, PCT Application No. PCT/CN2019/096157, English Translation of International Search Report dated Oct. 8, 2019, 5 pages.

Foreign Communication From a Counterpart Application, PCT Application No. PCT/CN2019/096157, English Translation of Written Opinion dated Oct. 8, 2019, 4 pages.

"Introducing Docker Enterprise Edition 2.0, No Lock-in: Multi-Linux and Windows. Multi-Cloud. Swarm or Kubernetes," Jul. 19, 2018, 8 pages.

"What's LXC," Linux Containers, Jul. 19, 2018, 3 pages.

"Unikernels, Rethinking Cloud Infrastructure," 2018, 3 pages.

* cited by examiner

BASIC RUNTIME ENVIRONMENT

CROSS-REFERENCE TO RELATED APPLICATIONS

Not applicable.

TECHNICAL FIELD

Embodiments of the present disclosure relate to the field of embedded software technology, and in particular, to a method and an apparatus for decoupling an application's functionality and execution resources from a run time environment.

BACKGROUND

An embedded system is a combination of computer hardware and software that is designed to perform a dedicated or a particular set of functions. Examples of embedded systems include, but are not limited to, microwave ovens, calculators, digital watches, global positioning system (GPS) receivers, heart monitors, radar guns, engine controllers, digital cameras, traffic lights, remote controls, fax machines, cash registers, gas pumps, credit/debit card readers, thermostats, pacemakers, blood gas monitors, and grain analyzers.

Embedded systems may also be part of a larger system or product as in the case of an antilock braking system in a car, or Internet of Things (IoT) devices and gateways. IoT devices are physical devices, vehicles, home appliances and other items (commonly referred to as smart devices) that are embedded with electronics, software, sensors, actuators, and connectivity which enable these devices to connect and exchange data, creating opportunities for more direct or autonomous integration with less human interaction. IoT gateways enable IoT devices to communicate across various networks.

SUMMARY

According to a first aspect of the present disclosure, there is provided a computer implemented method performed by an application-specific basic runtime environment (BRE) for providing workload resource management to applications in an embedded system. The method includes receiving, by the application-specific BRE, workload resource requirements of an application installed on the embedded system. The method includes obtaining, by the application-specific BRE, the workload resource requirements from an operating system of the embedded system. The method includes providing, by the application-specific BRE, the workload resource requirements to the application. The method includes initiating, by the application-specific BRE, the execution of the application on the embedded system.

According to a second aspect of the present disclosure, there is provided an apparatus that includes a memory storage unit comprising instructions; and one or more processors in communication with the memory storage unit, wherein the one or more processors execute the instructions to: receive, by an application-specific BRE, workload resource requirements of an application installed on the apparatus; obtain, by the application-specific BRE, the workload resource requirements from an operating system of the apparatus; provide, by the application-specific BRE, the workload resource requirements to the application; and initiate, by the application-specific BRE, the execution of the application on the apparatus.

According to a third aspect of the present disclosure, there is provided a computer program product embodied in a non-transitory computer readable medium having computer executable program code embodied thereon, said computer executable program code when executed by a processor performs a workload resource management operation comprising: receiving, by an application-specific BRE, workload resource requirements of an application installed on a system; obtaining, by the application-specific BRE, the workload resource requirements from an operating system of the system; providing, by the application-specific BRE, the workload resource requirements to the application; and initiating, by the application-specific BRE, the execution of the application on the system.

In the any of the preceding aspects, the application-specific BRE may negotiate with a kernel of the operating system using a control groups (C-groups) feature of the kernel for processing resource requirements specified by workload resource requirements of the application.

In the any of the preceding aspects, the application-specific BRE may negotiate with a kernel of the operating system using a C-groups feature of the kernel for memory resource requirements specified by workload resource requirements of the application.

In the any of the preceding aspects, the application-specific BRE may negotiate with a kernel of the operating system using a C-groups feature of the kernel for disk input/output (I/O) requirements specified by workload resource requirements of the application.

In the any of the preceding aspects, the application-specific BRE may negotiate with a kernel of the operating system using a namespaces feature of the kernel for isolation requirements specified by the workload resource requirements of the application.

In the any of the preceding aspects, the application-specific BRE may negotiate with a kernel of the operating system using a capabilities feature of the kernel for enhanced capability requirements specified by workload resource requirements of the application.

In the any of the preceding aspects, the application-specific BRE may negotiate with a kernel of the operating system using a Berkeley Packet Filter (BPF) for security requirements specified by the workload resource requirements of the application.

In the any of the preceding aspects, the application-specific BRE may be configured to provide the workload resource requirements to the application independent of a type of the operating system.

In the any of the preceding aspects, the application-specific BRE may be configured to provide the workload resource requirements to the application independent of a programming language of the application.

In the any of the preceding aspects, the application-specific BRE may be configured to provide the workload resource requirements to the application independent of a workload execution environment of the application.

The above aspects and other aspects as well as the advantages thereof are described below in the Detailed Description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
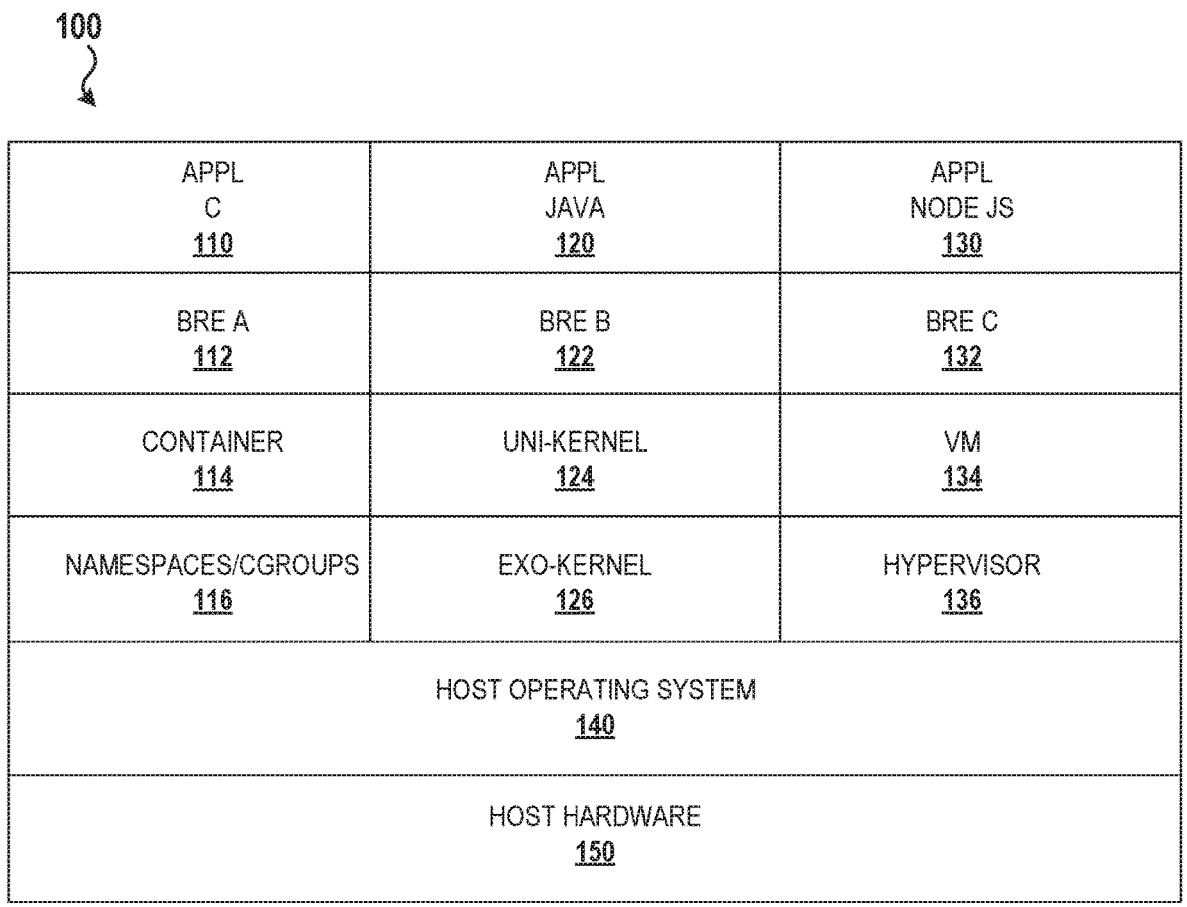
FIG. 1 is a schematic diagram illustrating a system architecture in accordance with an embodiment of the present disclosure.

The illustrated figures are only exemplary and are not intended to assert or imply any limitation with regard to the environment, architecture, design, or process in which different embodiments may be implemented. Any optional component or steps are indicated using dash lines in the illustrated figures.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an", and "the" are intended to include the plural forms as well, unless the context clearly indicates otherwise.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a unit may also refer to a particular set of functions, software instructions, or circuitry that is configured to perform a specific task.

A network as referenced herein means a system of electronic devices that are joined together via communication links to enable the exchanging of information and/or the sharing of resources. Non-limiting examples of networks include local-area networks (LANs), wide-area networks (WANs), metropolitan-area networks (MANs), passive optical networks (PONs), and radio access networks (RANs). The networks may include one or more private networks and/or public networks such as the Internet. In various embodiments, the networks may employ any type of communication standards and/or protocol.

Embedded systems are predominantly closed environments in which system resources are not shared. When a third party application is introduced in embedded systems with resource restriction, the third party application needs to be isolated, manageable, and secure. For example, the third party application needs system resources like central processing unit (CPU), memory, persistent storage, access permission to I/O, execution environment, and isolation. Existing container technology is lightweight, but is not built to manage the sharing of the system resources. Thus, for embedded systems such as, but not limited to, IoT gateways, an open architecture is required to enable third party applications to coexist with existing vendor applications while using the containers. Thus, there is a need for technology that enables a third party application to be able to specify its requirements and for the embedded system to be able to honor the request.

Accordingly, the present disclosure provides various embodiments for separating, from a third party application, the functions of gathering system resources, access permissions, privilege operation, and security from an operating system by delegating workload resource management of the application to an application-specific BRE. For example, in one embodiment, a computer implemented method for providing workload resource management to applications in an embedded system is disclosed. The method includes receiving, by an application-specific basic runtime environment, workload resource requirements from an application installed on the embedded system; obtaining, by the application-specific basic runtime environment, the workload resource requirements from an operating system of the embedded system; providing, by the application-specific basic runtime environment, the workload resource requirements to the application executing on the embedded system; and initiating, by the application-specific basic runtime environment, the execution of the application on the embedded system.

FIG. 1 is a schematic diagram illustrating a system architecture 100 in accordance with an embodiment of the present disclosure. In the depicted embodiment, the system architecture 100 includes host hardware 150, host operating system 140, and three software applications: application C 110, application Java 120, and application node.JavaScript (JS) 130.

The host hardware 150 represents the actual hardware resources of the system such as, but not limited to, one or more processor/microcontroller/CPUs, sensors, protection circuitry, memory, persistent storage, and I/O devices. The CPU is responsible for running or executing programs or other instructions. The processing speed, memory space, and other specifications may vary in different embodiments based on the operating system or other application requirements.

The host operating system 140 comprises the software that supports the host's basic functions, such as scheduling tasks, executing applications, managing hardware devices such as the hard disk, and controlling peripherals. The host operating system 140 includes a kernel that is the core of the operating system. The kernel may load as part of the system start-up process and may handle the rest of start-up as well as input/output requests from software and peripherals, translating them into data-processing instructions for the CPU.

Application C 110 may be any type of software application written in the C programming language. Application Java 120 may be any type of software application written in the java programming language. Application node.JS 130 may be any type of node.js software application. Node.js is a JavaScript run-time environment. Although these three particular applications are depicted, the system architecture 100 may support any number and type of applications.

In the depicted embodiment, each of the applications is associated with their own application-specific BRE. As referenced herein, an application-specific BRE is a BRE that is configured to negotiate a workload resource requirement for a particular application. A BRE provides a runtime environment for an application to request access to resources necessary for supporting the execution of the application or program. In various embodiments, a BRE is agnostic of application type such as, but not limited to, Java, C, Python, or node.JS. For example, in the depicted embodiment, BRE A 112 is a BRE that is configured to negotiate a workload resource requirement for the Application C 110, BRE B 122 is a BRE that is configured to negotiate a workload resource requirement for the Application Java 120, and BRE C 132 is a BRE that is configured to negotiate a workload resource requirement for the Application node.JS 130. Workload resource requirements are resources of the host system that are required to execute or run an instance of an application. Non-limiting examples of workload resource requirements that may be negotiated or facilitated by an application-specific BRE include, but are not limited to, CPU, memory, isolation, rootfs, I/O, networking, privilege access, security, application environment, and orchestration. Isolation refers to whether resources for a particular process or application are required to be isolated from the resources of other applications. Rootfs refers to the initial file system that enables the startup code to run and mount other storage devices like raid arrays, etc. I/O refers to an application input/output usage, which may include network I/O and disk I/O usage. Disk I/O usage refers to the read and write operations on a physical disk. Networking refers to an application's communication requirements or configurations such as, but not limited to, network bandwidth and networking protocol/stack. Orchestration refers to the arrangement, coordination, and management of resources or applications.

Additionally, in various embodiments, a BRE is independent of a workload execution environment of an application. A workload execution environment (or execution environment) is an environment or platform in which an application executes. There are various types of environments or platforms in which an application may be executed. For example, in the depicted embodiment, Application C 110 is implemented using one or more containers 114 (e.g., Docker containers or Linux containers), application Java 120 is implemented using uni-kernel 124, and application node.JS 130 is implemented using virtual machine (VM) 134.

Container 114 is a lightweight, stand-alone, executable package of a piece of software that includes everything needed to run it: code, runtime, system tools, system libraries, and settings. Container 114 isolates software from its surroundings, for example differences between development and staging environments, and helps reduce conflicts between teams running different software on the same infrastructure. In the depicted embodiment, the BRE A 112 may facilitate or negotiate workload resource requirements for the Application C 110 using namespaces and/or control groups (C-groups or Cgroups) 116. Namespaces are a feature of the Linux kernel that partition kernel resources such that one set of processes sees one set of resources while another set of processes sees a different set of resources. Cgroups is a Linux kernel feature that limits, accounts for, and isolates the resource usage (CPU, memory, disk I/O, network, etc.) of a collection of processes.

Uni-kernel 124 is a specialized, single address space machine image constructed by using library operating systems. These libraries are then compiled with the application Java 120 and configuration code to build sealed, fixed-purpose images which run directly on a hypervisor or hardware via an exo-kernel 126. Exo-kernel 126 is an operating system that provides application-level management of hardware resources. This architecture is designed to separate resource protection from management to facilitate application-specific customization. The Exo-kernel 126 operating system architecture safely provides untrusted software efficient control over hardware and software resources by separating management from protection.

VM 134 is an emulation or virtual instance of a computer system including an operating system for running an application. Virtual machines are used to share and isolate system resources. VM 134 is executed or managed by a hypervisor 136. Hypervisor 136 or virtual machine monitor (VMM) is computer software, firmware, or hardware that creates and runs VMs.

As stated above, the disclosed embodiments separate, from an application's functionality, the functions of gathering or negotiating workload resource requirements such as, but not limited to, system resources, access permissions, privilege operations, and security from an operating system by delegating the workload resource management to an application-specific BRE. In one embodiment, the resource requirements are defined by the application and provided to the application-specific BRE. The application-specific BRE negotiates the resources from the operating system. The application-specific BRE provides the application with system resources, device emulation/access control, privileged operation, management, isolation, and security independent of language, CPU type, and operating system (OS). Thus, the disclosed embodiments enable third party applications to coexist within a previously closed environment by protecting the host system and network from un-authorized operations from a third party application.

Figure 2:
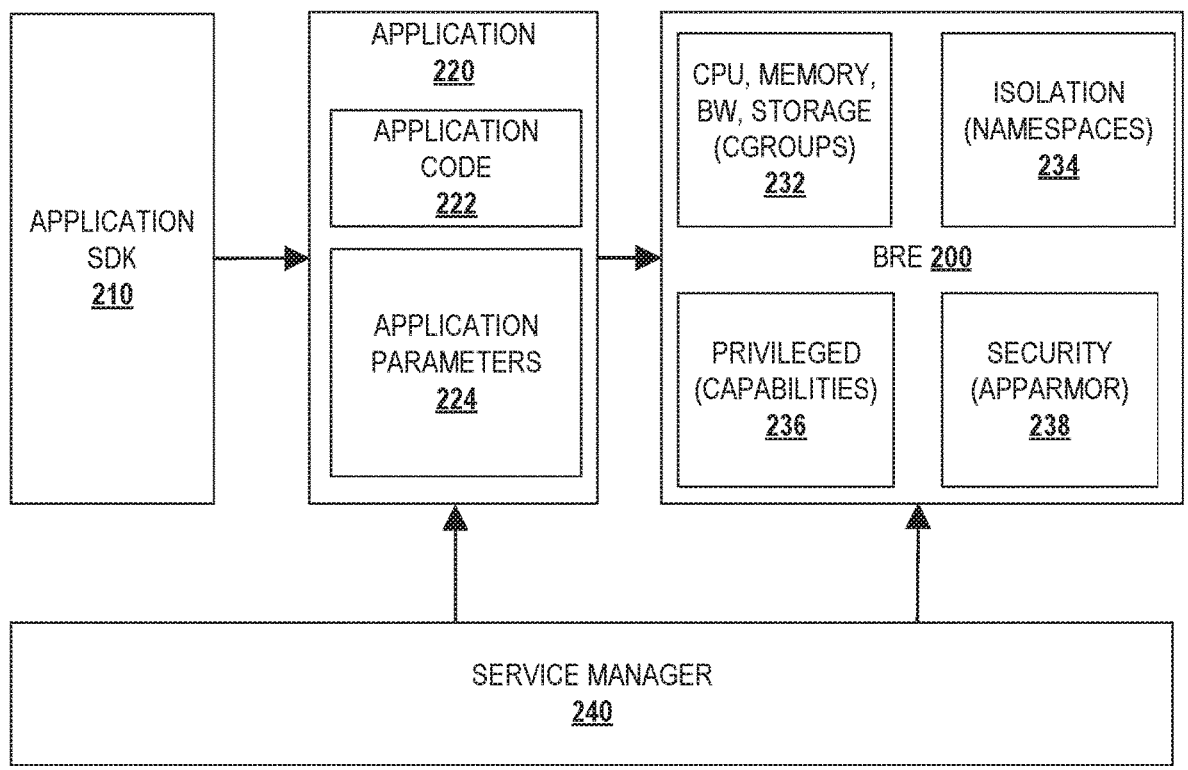
FIG. 2 is a schematic diagram illustrating BRE in accordance with an embodiment of the present disclosure.

FIG. 2 is a schematic diagram illustrating a BRE 200 in accordance with an embodiment of the present disclosure. The BRE 200 may be an embodiment of any of the BREs (BRE A 112, BRE B 122, and BRE C 132) described in FIG. 1. In the depicted embodiment, the BRE 200 interacts with an application software development kit (SDK) 210 and a service manager 240.

The application SDK 210 is a set of software development tools that allows the creation of applications for a certain software package, software framework, hardware platform, computer system, operating system, or similar development platform. For example, the application SDK 210 may be used to create an application 220 and specify its dependents, resource requirements, and access capabilities. The application 220 may be any type of application. As stated above, the application 220 may be implemented using various programming languages and workload execution environments such as those described in FIG. 1. In the depicted embodiment, the application 220 includes application code 222 and application parameters 224. The application code 222 may include executable code/instructions for performing the features of the application 220. The application parameters 224 may include the application type along with workload resource requirements and execution configuration parameters of the application 220 that are specified by the application SDK 210.

The BRE 200 receives as input data the workload resource requirements and execution configuration parameter of the application 220. Based on the requirements of the application 220, the BRE 200 creates, negotiates, and/or facilitates system resources and permission for executing the application 220. In the depicted embodiment, the BRE 200 includes a physical resource module 232, an isolation module 234, a privilege module 236, and a security module 238.

The physical resource module 232 is configured to perform resource partitioning to obtain workload resources such as, but not limited to, CPU, memory, and network bandwidth for the application 220. In one embodiment, the physical resource module 232 is configured to negotiate with the kernel of the operating system to obtain the workload resources of the application 220 using the Cgroups feature of the kernel.

In one embodiment, the isolation module 234 is configured to negotiate with the kernel of the operating system for isolation using the namespaces feature of the kernel. Isolation means protecting the processes and data of the application from other processes and data of other applications that are executing on the host system. For example, in one embodiment, the isolation module 234 is configured to negotiate with the kernel of the operating system for host's file system, host's I/O, and host's networking stack using namespaces.

In one embodiment, the privilege module 236 is configured to negotiate with the kernel of the operating system for enhanced capability using the capabilities feature of the kernel. The capabilities feature is configured to define the permissions or capabilities of what a process or application is allowed to do, which reduces security risks to the host. Enhance capability means capabilities that are not given to a regular/normal process or application. An example of enhanced capability is privilege access. Privileged access (sometimes referred to as superuser or root), enables processes of an application to bypass all kernel permission checks, while unprivileged access means that the processes are subject to full permission checking.

In one embodiment, the security module 238 is configured to facilitate security for the application 220 with the kernel of the operating system. In one embodiment, the security module 238 may use Linux Security Modules (LSM) and/or AppArmor for facilitating the desired security for the application 220. LSM is a framework that allows the Linux kernel to support a variety of access control modules. AppArmor is a Mandatory Access Control (MAC) system style security extension for the Linux kernel.

As stated above, the service manager 240 communicates with the BRE 200 and the application 220. In one embodiment, the service manager 240 installs the BRE 200 and the application 220 on the host system. The service manager 240 may also be configured to create an execution environment for starting the application 220. In various embodiments, the service manager 240 is configured to automatically manage and update configuration information of the application 220.

Figure 3:
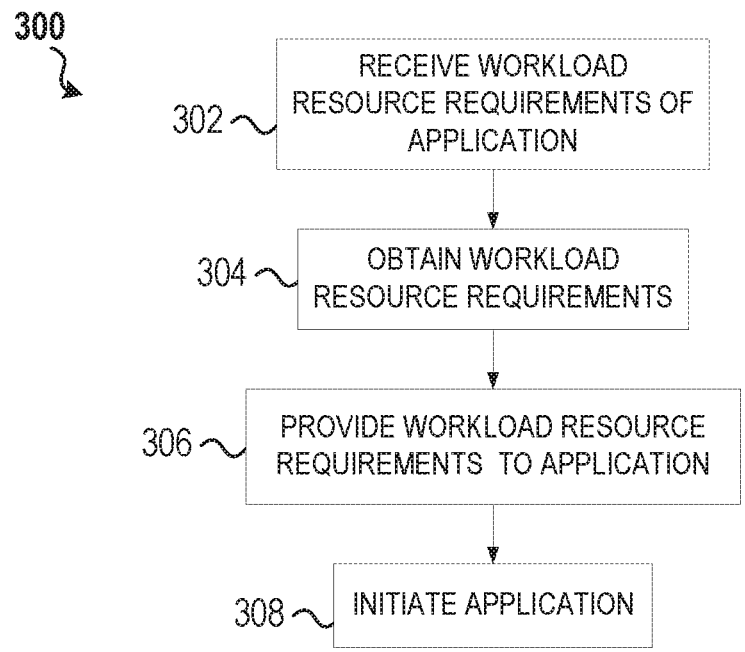
FIG. 3 is a flowchart illustrating a method performed by a BRE in accordance with an embodiment of the present disclosure.

FIG. 3 is a flowchart illustrating a method 300 performed by a BRE in accordance with an embodiment of the present disclosure. The method 300 may be implemented and executed by a BRE such as the BRE 200 in FIG. 2. In one embodiment, the BRE is an application-specific BRE that is configured to facilitate obtaining the workload resource requirements for a particular application installed on an embedded system. In the depicted embodiment, the method 300, at step 302, begins by receiving workload resource requirements of an application installed on the embedded system. The workload resource requirements of the application may be specified during development of the application using an application SDK. At step 304, the method 300 obtains the workload resource requirements from an operating system of the embedded system. Various implementations may be used to obtain the workload resource requirements. An example embodiment is described below in reference to FIG. 4. The method, at step 306, provides the workload resource requirements to the application. At step 308, the method 300 initiates the execution of the application on the embedded system.

Figure 4:
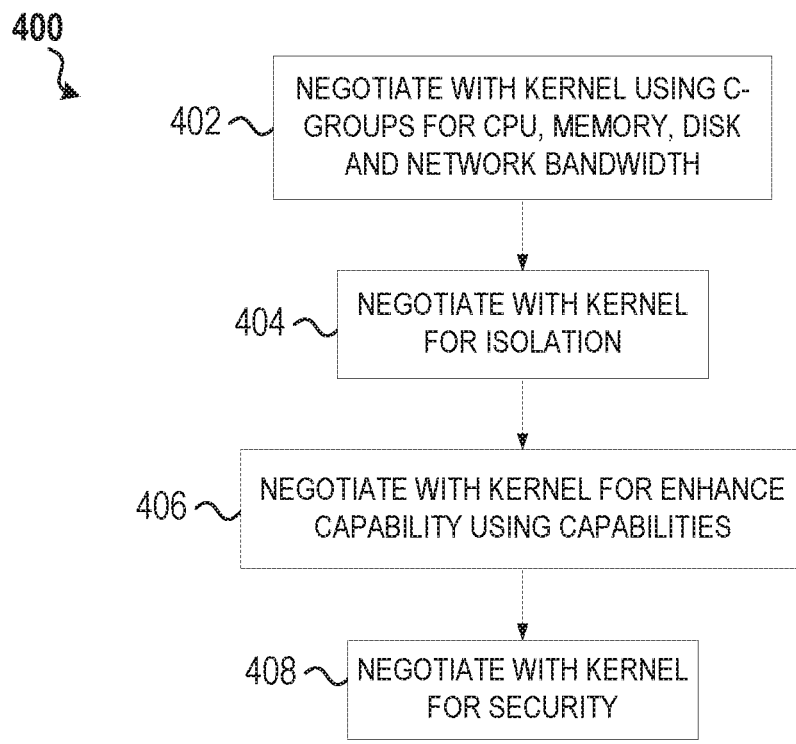
FIG. 4 is a flowchart illustrating a method for facilitating system resources and permissions in accordance with an embodiment of the present disclosure.

FIG. 4 is a flowchart illustrating a method 400 for obtaining the workload resource requirements in accordance with an embodiment of the present disclosure. The method 400 may be implemented and executed by a BRE such as the BRE 200 in FIG. 2.

In the depicted embodiment, the method 400, at step 402, negotiates with a kernel of the operating system using C-groups feature of the kernel for system resource requirements such as CPU, memory, disk, and network bandwidth that are specified by the workload resource requirements of the application. At step 404, the method 400 negotiates with the kernel of the operating system using a namespaces feature of the kernel for isolation requirements specified by the workload resource requirements of the application. The method 400, at step 406, negotiates with the kernel of the operating system using a capabilities feature of the kernel for enhanced capability requirements specified by the workload resource requirements of the application. At step 408, the method 400 negotiates with the kernel of the operating system for security requirements specified by the workload resource requirements of the application. In one embodiment, the method 400 may use a Berkeley Packet Filter (BPF) for negotiating with the kernel of the operating system for the security requirements specified by the workload resource requirements of the application. A BPF is a raw (protocol independent) socket interface to the data link layer that allows filtering of packets in a very granular fashion. BPF consists of bytecode that is injected from userspace into the kernel, where it is checked by a verifier to prevent kernel crashes or security issues.

Figure 5:
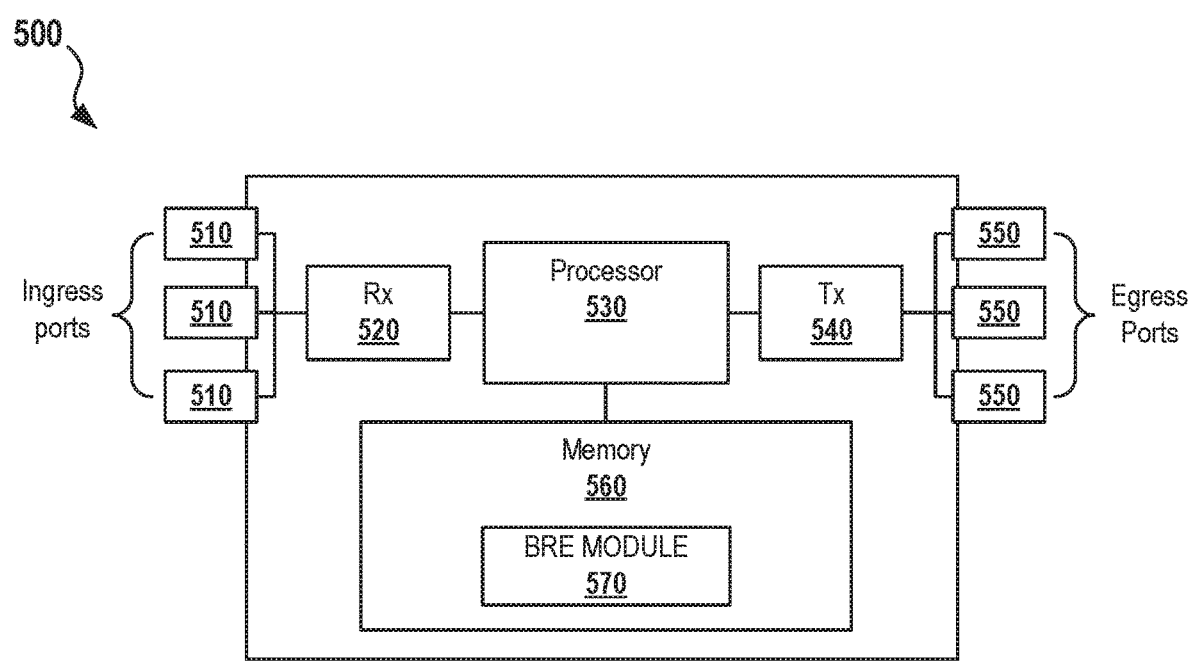
FIG. 5 is a schematic diagram illustrating an apparatus in accordance with an embodiment of the present disclosure.

FIG. 5 is a schematic diagram of an apparatus 500 configured to implement one or more of the methods disclosed herein according to an embodiment of the disclosure. It should be noted that the apparatus 500 is intended to illustrate a basic example of a system that may be used to implement one or more of the various embodiments described herein. For example, the apparatus 500 may be used to implement an IoT gateway or other embedded systems that are configured to perform the methods described herein. The depicted apparatus 500 is not intended to be limiting with respect to any of the claims in the present application because the described components may be combined, modified, or replaced in various systems without departing from the scope of the claims. Additionally, in certain embodiments, the apparatus 500 may include additional components not depicted in FIG. 5 to implement one or more features of the claims.

Referring now to the depicted embodiment, the apparatus 500 comprises ingress ports 510 and receiver units (Rx) 520 for receiving data, a processor 530 to process the data, transmitter units (TX) 540 and egress ports 550 for transmitting the data, and a memory 560 for storing the data. The apparatus 500 may also comprise optical-to-electrical (OE) components and electrical-to-optical (EO) components coupled to the ingress ports 510, the receiver units 520, the transmitter units 540, and the egress ports 550 for converting optical signals to electrical signals, and vice-versa.

The memory 560 comprises one or more disks, tape drives, or solid-state drives and may be used as an over-flow data storage device, to store programs when such programs are selected for execution, or to store instructions and data that are read during program execution. The memory 560 may be volatile and/or non-volatile and may be read-only memory (ROM), random-access memory (RAM), ternary content-addressable memory (TCAM), or static random-access memory (SRAM).

The processor 530 is implemented by any suitable combination of hardware, middleware, firmware, and software. The processor 530 may be implemented as one or more CPU chips, cores (e.g., as a multi-core processor), field-programmable gate arrays (FPGAs), application specific integrated circuits (ASICs), or digital signal processors (DSPs). The processor 530 is in communication with the ingress ports 510, receiver units 520, transmitter units 540, egress ports 550, and memory 560. In one embodiment, the memory 560 comprises a BRE module 570. The BRE module 570 comprises executable instructions for implementing the disclosed embodiments as described above. The processor 530 is configured to execute the executable instructions. The executable instructions may be in any form including high level code to machine code consisting of binary or hexadecimal instructions.

Accordingly, the disclosed embodiments enable systems, such as, but not limited to, embedded systems that are predominantly closed environments, to provide an open architecture where other third party applications can coexist with existing applications by managing the sharing of system resources using application-specific BREs. The disclosed embodiments enable separation of an application's functionality from the functions of gathering system resource, access permissions, privilege operation, and security from an operating system by delegating workload resource management to an application-specific BRE. In various embodiments, an application can define the application requirements. The application-specific BRE negotiates the resources from the operating system and provides the application with system resource, access permission, isolation, and security. In various embodiments, the application-specific BRE performs these functions independent of language, CPU type, execution environment, and OS.

Advantages of the disclosed embodiments include, but are not limited to, enabling third party applications to coexist with existing environments while addressing any internal security of the host system. Additionally, the disclosed embodiments may protect the host system from unauthorized operations or access from authorized and/or unauthorized users.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, units, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A computer implemented method for providing workload resource management to applications in an embedded system, the method comprising:
   receiving, by an application-specific runtime environment, workload resource requirements of an application installed on the embedded system;
   obtaining, by the application-specific runtime environment, the workload resource requirements from an operating system of the embedded system;
   providing, by the application-specific runtime environment, the workload resource requirements to the application; and
   initiating, by the application-specific runtime environment, execution of the application on the embedded system.

2. The method of claim 1, wherein obtaining, by the application-specific runtime environment, the workload resource requirements from the operating system of the embedded system comprises negotiating with a kernel of the operating system using a control groups (C-groups) feature of the kernel for processing resource requirements specified by workload resource requirements of the application.

3. The method of claim 1, wherein obtaining, by the application-specific runtime environment, the workload resource requirements from the operating system of the embedded system comprises negotiating with a kernel of the operating system using a C-groups feature of the kernel for memory resource requirements specified by workload resource requirements of the application.

4. The method of claim 1, wherein obtaining, by the application-specific runtime environment, the workload resource requirements from the operating system of the embedded system comprises negotiating with a kernel of the operating system using a C-groups feature of the kernel for disk input/output (I/O) requirements specified by workload resource requirements of the application.

5. The method of claim 1, wherein obtaining, by the application-specific runtime environment, the workload resource requirements from the operating system of the embedded system comprises negotiating with a kernel of the operating system using a namespaces feature of the kernel for isolation requirements specified by the workload resource requirements of the application.

6. The method of claim 1, wherein obtaining, by the application-specific runtime environment, the workload resource requirements from the operating system of the embedded system comprises negotiating with a kernel of the operating system using a capabilities feature of the kernel for enhanced capability requirements specified by workload resource requirements of the application.

7. The method of claim 1, wherein obtaining, by the application-specific runtime environment, the workload resource requirements from the operating system of the embedded system comprises negotiating with a kernel of the operating system using a Berkeley Packet Filter (BPF) for security requirements specified by the workload resource requirements of the application.

8. The method of claim 1, wherein the application-specific runtime environment is configured to provide the workload resource requirements to the application independent of a type of the operating system.

9. The method of claim 1, wherein the application-specific runtime environment is configured to provide the workload resource requirements to the application independent of a programming language of the application.

10. The method of claim 1, wherein the application-specific runtime environment is configured to provide the workload resource requirements to the application independent of a workload execution environment of the application.

11. An apparatus comprising
a memory storage unit comprising instructions; and
one or more processors in communication with the memory storage unit, wherein the one or more processors execute the instructions to:
   receive, by an application-specific runtime environment, workload resource requirements of an application installed on the apparatus;
   obtain, by the application-specific runtime environment, the workload resource requirements from an operating system of the apparatus;
   provide, by the application-specific runtime environment, the workload resource requirements to the application; and
   initiate, by the application-specific runtime environment, execution of the application on the apparatus.

12. The apparatus of claim 11, wherein the one or more processors execute the instructions to negotiate with a kernel of the operating system using a control groups (C-groups) feature of the kernel for processing resource requirements specified by workload resource requirements of the application.

13. The apparatus of claim 11, wherein the one or more processors execute the instructions to negotiate with a kernel of the operating system using a C-groups feature of the kernel for memory resource requirements specified by workload resource requirements of the application.

14. The apparatus of claim 11, wherein the one or more processors execute the instructions to negotiate with a kernel of the operating system using a namespaces feature of the kernel for isolation requirements specified by the workload resource requirements of the application.

15. The apparatus of claim 11, wherein the one or more processors execute the instructions to negotiate with a kernel of the operating system using a capabilities feature of the kernel for enhanced capability requirements specified by workload resource requirements of the application.

16. The apparatus of claim 11, wherein the one or more processors execute the instructions to negotiate with a kernel of the operating system using a Berkeley Packet Filter (BPF) for security requirements specified by the workload resource requirements of the application.

17. The apparatus of claim 11, wherein the application-specific runtime environment is configured to provide the workload resource requirements to the application independent of a type of the operating system, a programming language of the application, and a workload execution environment of the application.

18. A computer program product embodied in a non-transitory computer readable medium having computer executable program code embodied thereon, said computer executable program code when executed by a processor performs a workload resource management operation comprising:
   receiving, by an application-specific runtime environment, workload resource requirements of an application installed on a system;
   obtaining, by the application-specific runtime environment, the workload resource requirements from an operating system of the system;
   providing, by the application-specific runtime environment, the workload resource requirements to the application; and
   initiating, by the application-specific runtime environment, execution of the application on the system.

19. The computer program product of claim 18, wherein the application-specific runtime environment is configured to provide the workload resource requirements to the application independent of a type of the operating system.

20. The computer program product of claim 18, wherein the application-specific runtime environment is configured to provide the workload resource requirements to the application independent of a workload execution environment of the application.

* * * * *